United States Patent [19]

Ponticelli

[11] Patent Number: 4,986,499
[45] Date of Patent: Jan. 22, 1991

[54] RADIO INSTALLATION KIT WITH CONVERTIBLE FRONT PANEL

[76] Inventor: Robert J. Ponticelli, 20274 Delita Dr., Woodland Hills, Calif. 91364

[21] Appl. No.: 403,112

[22] Filed: Sep. 5, 1989

[51] Int. Cl.$^5$ ............................................. G12B 9/00
[52] U.S. Cl. ................................... 248/27.1; 248/909; 248/300
[58] Field of Search ............... 248/27.1, 27.3, 544, 248/900, 903, 909, 300; 428/43, 58, 61; 403/2

[56] References Cited

U.S. PATENT DOCUMENTS

| | | | |
|---|---|---|---|
| 1,945,925 | 2/1934 | Stiefel | 403/2 |
| 2,645,488 | 7/1953 | Jorgenson | 403/2 X |
| 3,035,446 | 5/1962 | Ross | 248/27.1 X |
| 4,023,305 | 5/1977 | Harschel | 428/43 X |
| 4,071,970 | 2/1978 | Strizki | 403/2 X |
| 4,079,838 | 3/1978 | Granum | 248/909 |
| 4,149,692 | 4/1979 | Califano | 248/909 X |
| 4,451,411 | 5/1984 | LeFevre | 248/544 X |
| 4,532,727 | 8/1985 | Klose et al. | 40/152 |
| 4,560,124 | 12/1985 | Alves et al. | 248/27.1 |
| 4,711,046 | 12/1987 | Herrgood | 40/152.1 |
| 4,736,924 | 4/1988 | Bednar | 248/27.1 X |
| 4,865,203 | 9/1989 | Ueda | 206/608 X |

FOREIGN PATENT DOCUMENTS 585186  1/1945  United Kingdom ................. 428/58

*Primary Examiner*—Alvin C. Chin-Shue
*Attorney, Agent, or Firm*—Edward A. Sokolski

[57] ABSTRACT

An installation assembly for use in installing radio equipment in a vehicle has a front panel with a pair of front panel sections which are joined together along a breakaway seam. A pair of tabs are used to interconnect the panel sections together at their opposite ends to make for a rigid firm joinder therebetween. The assembly can be used in its original form for a first equipment installation. For a second equipment installation, the panel sections are separated from each other and only one section utilized, this end result being achieved by first breaking off the tabs and then separating the sections from each other along the breakaway seam.

1 Claim, 2 Drawing Sheets

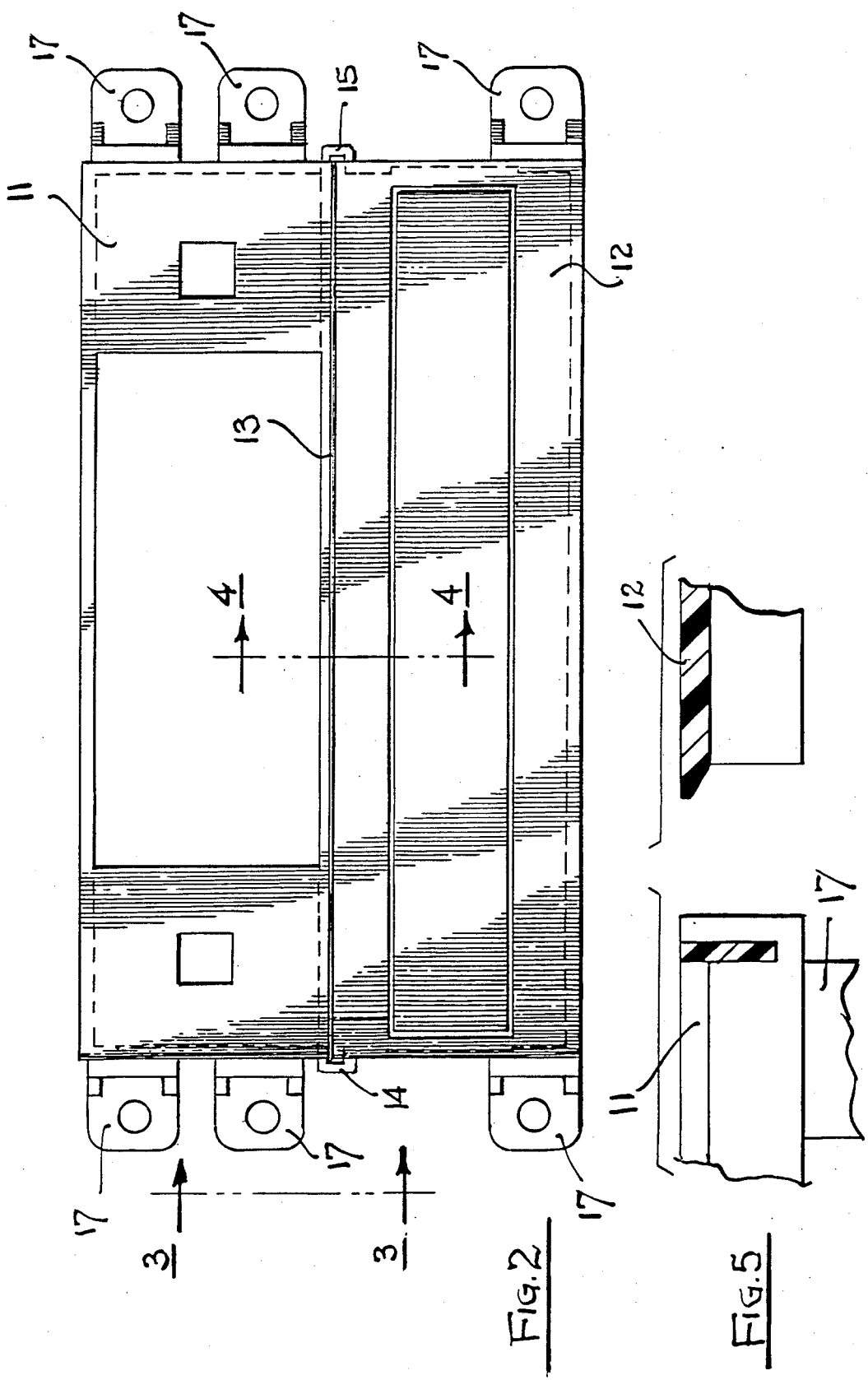

A
RADIO INSTALLATION KIT WITH CONVERTIBLE FRONT PANEL

BACKGROUND OF THE INVENTION

1. Field of the Invention

This invention relates to radio installation kits particularly suitable for installing vehicle radios and more particularly to such a kit having a front panel which can be adapted for use with either double sections or a single section.

2. Description of the Prior Art

To handle the installation of a variety of different radio installations in a variety of different vehicles, a number of universal mounting systems have been developed. Such systems are described in my U.S. Pat. Nos. 4,742,978 and 4,699,341; U.S. Pat. Nos. 4,462,564 and 4,560,124 to Alves; U.S. Pat. Nos. 4,067,654 and 4,068,175 to Maniaci; and U.S. Pat. No. 3,922,047 to Tsugi. To suit different radio equipment, different front panels are often required which must be provided for each installation.

SUMMARY OF THE INVENTION

The installation kit of the present invention is a single assembly which is readily adaptable for use in installing either of two radio equipments. This end result is achieved by providing paired front panel sections both of which are employed for one of the equipments and only one of which is employed for the other. These front panels are joined together along a thin "breakaway" seam or the like, the joinder between the panel sections being reinforced by means of a pair of tabs which interconnect the opposite ends of the panel sections. With the tabs in place the two panels are firmly joined together. When these tabs are removed, the panel sections can be folded along the breakaway seam and separated from each other.

It is therefore an object of this invention to provide a front panel installation kit for vehicle radios which can be converted for use for one or the other of two panel configurations.

Other objects of the invention will become apparent as the description proceeds in connection with the accompanying drawings of which:

BRIEF DESCRIPTION OF THE DRAWINGS

FIG. 2 is a front elevational view of the preferred embodiment;

FIG. 5 is a partial crossectional view showing the two panels separated from each other.

DETAILED DESCRIPTION OF THE INVENTION

Figure 1:
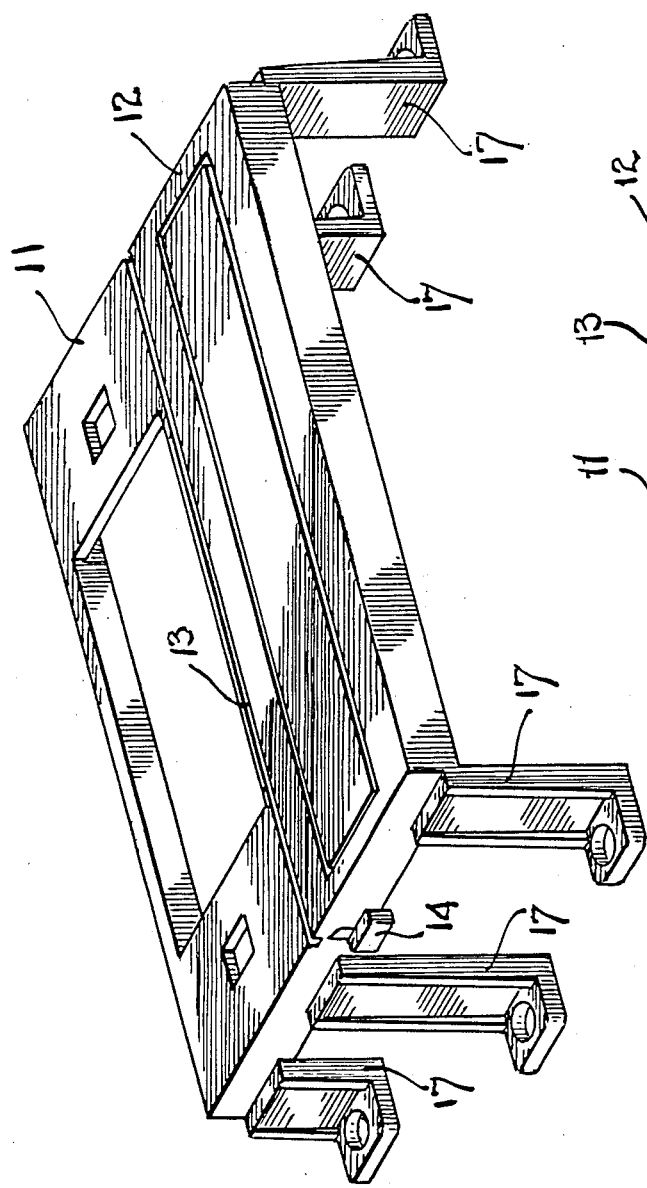
FIG. 1 is a front perspective view of a preferred embodiment of the invention.
Figure 3:
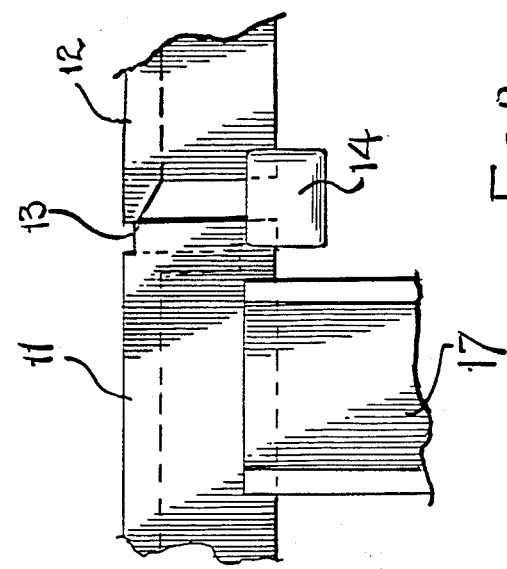
FIG. 3 is a view taken along the plane indicated by 3—3 in FIG. 2.
Figure 4:
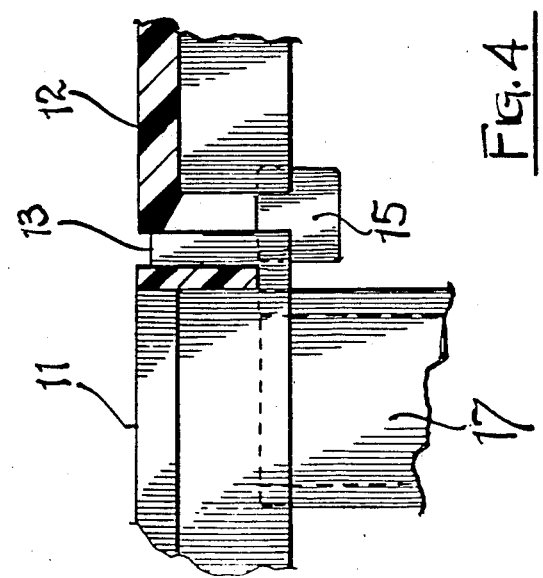
FIG. 4 is a crossectional view taken along the plane indicated by 4—4 in FIG. 2.

Referring now to the Figures, a preferred embodiment of the invention is shown.

Panel sections 11 and 12 are joined together along thin seam line 13. The joinder between the panel sections is reinforced and made rigid by means of tabs 14 and 15 which interconnect the opposite ends of the panel sections. A plurality of legs 17 extend from the panel sections and are used in mounting the assembly on a vehicle dash or the like.

The entire assembly can be used to mount a first piece of equipment, e.g. a radio and an associated equalizer. For an installation calling only for the radio, panel sections 11 and 12 are separated from each other by first breaking off tabs 14 and then folding along seam 13 to break the panel sections apart as shown in FIG. 5. In this manner, the single assembly can be used for either one of two installations.

While the invention has been described and illustrated in detail, it is to be clearly understood that this is intended by way of illustration and example only and is not to be taken by way of limitation.

I claim:

1. A radio installation kit comprising:
    a front panel having a pair of panel sections joined to each other along a breakaway seam, and
    a pair of breakaway tabs interconnecting said panel sections at the opposite ends thereof for providing a rigid firm joinder therebetween,
    whereby said front panel with said pair of panel sections therein is adapted for use in a first installation, and with said tabs being broken off and said panel sections separated from each other along said breakaway seam one of said panel sections is adapted for use in a second installation.

* * * * *